United States Patent [19]
Golemis et al.

[11] Patent Number: 5,332,279
[45] Date of Patent: Jul. 26, 1994

[54] POWER DOOR OPERATOR FOR MULTI-PASSENGER MASS TRANSIT VEHICLES

[75] Inventors: Fotios Golemis, Skokie; Michael A. O'Neill, Round Lake Beach, both of Ill.

[73] Assignee: Mark IV Transportation Products Corp., Niles, Ill.

[21] Appl. No.: 62,663

[22] Filed: May 17, 1993

[51] Int. Cl.$^5$ .............................................. B60J 5/04
[52] U.S. Cl. .................................. 296/146.4; 296/207; 49/122; 49/141; 49/379; 74/522; 74/625; 192/67 P; 192/89.2; 411/88; 411/956
[58] Field of Search ............ 296/146.4, 146.11, 146.13, 296/202, 207; 49/118, 122, 141, 368, 379; 74/522, 579 R, 625; 192/67 P, 89 RS, 99 S; 411/87, 88, 101, 147, 956

[56] References Cited
U.S. PATENT DOCUMENTS 2,893,506  7/1959  Daugirdas ........................ 49/110 X
4,375,140  3/1983  Blair et al. ........................... 49/108

Primary Examiner—David M. Mitchell
Assistant Examiner—Andrew C. Pike
Attorney, Agent, or Firm—Francis J. Lidd

[57] ABSTRACT

A power door operator for multi-passenger mass transit vehicles, typically buses, features electric actuation of dual swinging doors. A manual activator having an ergonometrically correct actuating plunger, for emergency door opening, operates a sleeved clutch. Fixed to the sleeve clutch is a drive bar with arms having individually adjustable lengths. The drive arms actuate outboard door shaft levers on individual door leaf through door drive rods intermediate the door arms and drive arms. Each rod incorporates spherical rod ends. The drive arms also actuate limit switches establishing door opened and door closed circuitry for energizing the electric drive system. The adjustable length clutch door drive arms provide a convenient device for controlling door leaf closing sequence and residual or door holding force when the doors are in a closed position.

9 Claims, 3 Drawing Sheets

5,332,279

POWER DOOR OPERATOR FOR MULTI-PASSENGER MASS TRANSIT VEHICLES

BACKGROUND OF THE INVENTION

This invention relates generally to power door operators for multi-passenger mass transit vehicles, more particularly to an overhead electrically driven door operator mounted for opening and closing dual leaf swing doors such as used in multiple passenger vehicles including, airport utility transports, school, and small transit buses.

Operators of the type disclosed herein are at present largely pneumatically actuated since in most large vehicles use of air brake systems provides a reliable and convenient source of operating air at controlled pressures. However, the vehicles described above incorporate hydraulic brake systems. Therefore, no air supply is available, and hydraulic door drives are high in cost and involve excessive maintenance in order to prevent leaks and loss of brake system integrity. A growing need for a reliable low cost electric bus door operator now exists.

An electric operator for transit vehicles disclosed in U.S. Pat. No. 4,375,140, the specification of which is hereby incorporated by reference. While presenting a required alternate approach to door equipment for certain vehicles, operators of the type disclosed in U.S. Pat. No. 4,375,140 have substantial shortcomings, including, among others, limited force for holding a door closed, lack of provision for controlling individual door leaf phasing (i.e., opening/closing relationship) in operation, and an attendant lack of adjustment of the hold-closed force. Further, the emergency release clutch employed is automatically reset on subsequent powered operation, and utilizes an actuating lever having a substantial protrusion into the passenger space.

The operator disclosed herein overcomes many of these problems through provision of adjustable length door drive lever arms, and an emergency door opening clutch having an actuating plunger incorporating improved and ergonometrically correct actuation. The clutch actuating plunger greatly reduces protrusion into passenger space.

OBJECTS OF THE INVENTION

It is, therefore, an object of the invention to provide a compact, easily maintained, low cost, electrically driven power operator nor multipassenger utility transport vehicles.

It is a further object of this invention to provide an electrically driven door operator for multipassenger vehicles having adjustable individual door panel phasing during opening and closing sequences.

It is a further object of this invention to provide an electric drive door operator for multipassenger vehicles wherein the forces holding the doors closed is easily adjustable.

It is yet an additional object of this invention to provide an electrical drive door operator for multipassenger vehicles wherein an emergency door opening actuator has improved ergonometric features.

SUMMARY OF THE INVENTION

The operator of this invention incorporates an electrically driven gear motor operating drive arms rotating approximately 160° in order to open and close a dual panel swing door set. A gear motor drive shaft operating through a sleeve clutch operates individually adjustable length drive arms of a drive bar in order to effect approximately 90° rotation of each door from open to closed and closed to open. The operating door shafts located at the outer edges of each panel have door arms affixed thereto for connection to the above-mentioned reciprocating drive arms through door drive rods. Each door drive rod end is interfaced between its respective drive arm and door arm with a spherical rod end, of the type sold under the name "ALIGNABAL®" (Registered Trade mark of Alignabal, Inc.).

In normal operation, the gear motor drive shaft and actuating arms are coupled through a fork operated sleeve clutch having a cooperating shaft key and drive bar slot coupling. Emergency manual disengagement on the clutch is accomplished through the use of a plunger actuator driving the pivoted clutch fork actuating a clutch collar. Movement of the clutch collar disengages the slot key and arm slot elements, thereby disengaging the doors and allowing movement independent of the gear motor drive shaft.

The above-mentioned rotating drive arms have an effective operating length which is individually adjustable in situ on each vehicle as produced. This feature provides for phasing the door panels, i.e., varying the movement of one swinging door panel relative to the other during door opening and closing. Variable drive arm length also allows control of the retention or hold-closed force when the doors are in a fully closed position, held against resilient mating door edges, and door leaf to vehicle body seals. This adjustable force feature is particularly advantageous since holding swinging doors in a closed position during bus operation against wind-lift forces created by air flow around the bus body is an obvious requirement. These adjustments also provide the means to obtain a properly operating door system, overcoming production variations present in all vehicles. Variations include door and vehicle body door aperture dimensions, and door operating shaft variations.

Rotation of the above-mentioned drive arms is confined to approximately 160° through the use of limit switches actuated by the drive arm ends. The switches operate to remove power from the gear motor drive when the proper rotation is achieved.

BRIEF DESCRIPTION OF THE DRAWINGS

Other objects and advantages of the disclosed invention will become apparent upon reading the following detailed description and upon reference to the drawings in which.

DETAILED DESCRIPTION OF OPERATION

Figure 1:
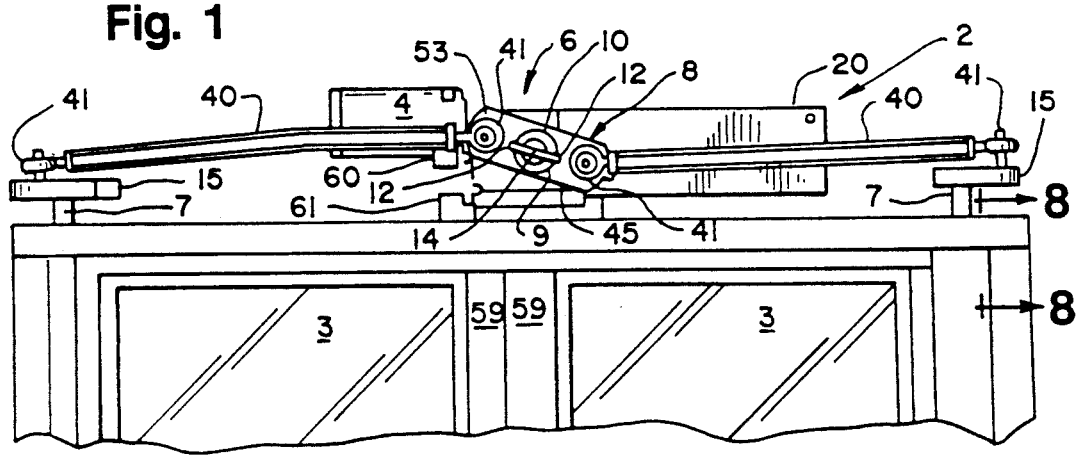
FIG. 1 is a partial view of the door system of the invention from inside the vehicle with cover removed, particularly showing the operator, door shafts and arms, and doors in a fully closed position.

In reference to FIGS. 1, 2, 3, 4, and 5, there is shown an operator assembly 2 mounted overhead of bus doors 3. The doors 3 are mounted on a baseplate 5. The baseplate 5 is attached to suitable side wall frame members of a bus or other vehicle. As installed, the operator provides swinging opening motion of doors 3 around vertical door shafts 7 through pivot levers 15. Rotation of the pivot levers 15 is obtained through rotary motion of a door drive bar assembly 8, acting through drive rods 40.

The door operator assembly 2 further comprises an electric motor 4 driving a gear box assembly 6 having an outwardly extending shaft 10. Mounted on and in sliding engagement with shaft 10 is a collar 11 having a peripheral groove 19. Also in sliding engagement with the gear box shaft and in sliding abutment, with the face of collar 11, is the drive bar 45. An essentially circular aperture 9 in drive bar 45 includes radial slots 14 arranged at 180° intervals along the aperture periphery. The gear box shaft 10 at its outer end has clutch teeth 12 perpendicularly extending from said shaft axis for engagement with said drive bar aperture slots 14. The combination of drive bar slots, gear box shaft teeth, and abutting gear box shaft slide collar 11 and clutch fork 20 define a clutch mechanism, operating through axial movement of the slide collar so as to engage and disengage the gear box shaft teeth 12 and drive bar aperture slots 14.

Figure 6:
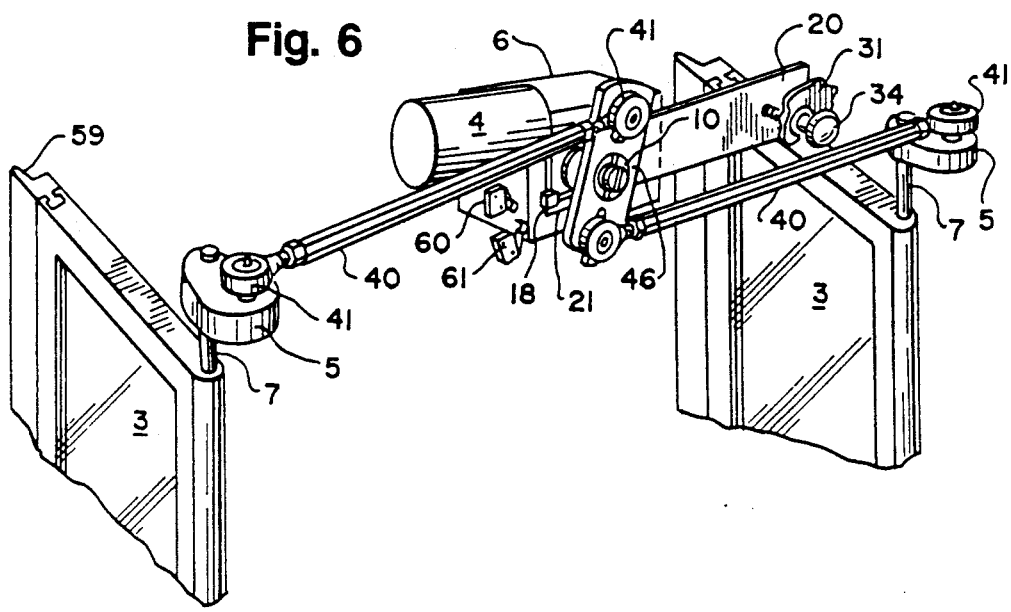
FIG. 6 is a partial perspective of the operator and doors of the invention in situ with the front panel in an operating position, particularly showing the doors in a partially open position.

Actuating the clutch is a drive fork assembly 16 having a pivot 18 and an actuating bar 20. The clutch fork assembly 16 also includes prongs or fingers 21 (Reference FIG. 6) extending around said slide collar periphery. Intermediate said clutch fork pivots 18 and operating bar 20 and extending from the clutch fork prongs and into said gear box shaft slide collar groove 19 are clutch upper and lower pins 17 (lower pin not shown), spaced 180° around collar 11.

Motion of the outer end of clutch fork 20 essentially parallel to the axis of the gear box shaft 10 required to disengage clutch teeth 12 and groove 14 is achieved through use of a manual actuator assembly 30. Actuator assembly 30, protruding through movable outer panel 31 (Reference FIG. 5), is removably mounted on panel 31 when panel 31 is positioned directly in front of the operator assembly 2.

Actuator assembly 30 comprises a mushroom headed plunger 34 slidably contained in a sleeve assembly 33 mounted on said movable panel 31. The head 34 of said plunger 32 is operable from the bus inside when said movable panel is in place. The plunger assembly 32 further includes an operating end 35, and an internally contained compression spring 36, acting to prevent vibration of said plunger internal of said sleeve during vehicular operation.

Also, intermediate said clutch fork actuating pins 17 and end 20 of the fork actuating bar is a clutch fork return spring assembly 22. The assembly 22 comprises a compression spring 23 contained on a retainer shaft 24. The shaft 24 is mounted on one side of the gear box assembly 6 via a U-bracket 25.

Swinging motion of doors 3 as indicated above is obtained through rotation of the door drive bar 8 when driven by the tooth/groove arrangement of the clutch assembly provided by action of the sliding shaft collar 11 in forcing said gear shaft teeth 12 and drive bar aperture slots 14 into engagement. Engaging force is generated by the clutch fork bar spring assembly 22 on the clutch fork operating bar 20 through pin 24.

The door drive bar assembly 8 rotates door shafts 7 through movement of pivotal levers 15 by translating the rotary motion of the ends of drive bar assembly 8 through drive rods 40. Fixed to each end of the drive rods 40 are spherically journaled coupling ends 41. Each drive rod is adjustable in length via threaded rod/nut adjustments 42. Since each drive rod is equipped with spherical couplings at each end, variations in rotational and/or translational movement of both the drive bar assembly 8 and door shafts 7 are accommodated. Angular displacement 43 of rods 40 during clutch operation is also acommodated.

In operation, rotary torque from the electric motor 4 is increased through the use of a mechanical gear box 6. Gear box 6 can be of the worm/pinion gear combination or other type of torque increasing construction. Rotation of the gear box shaft 10 is selectively transmitted to the door drive bar assembly 8 through engagement of teeth 12 on the gear box shaft 10 and cooperating slots 14 in the drive bar aperture 9.

In normal operation, engagement of teeth 12 and slots 41 is achieved through force exerted on the drive bar 8 by an abutting slide collar 11. The slide collar 11 is forceably directed outward and away from the gear box housing by the action of a clutch fork assembly 16 acting through upper and lower pins 17 extending internally into sliding collar 11 so as to be in sliding engagement with and projecting into a groove 19 in said sliding collar 11. Force exerted on the clutch fork actuating bar 20 by compression spring assembly 22 maintains the clutch fork in its actuated position (reference FIG. 5).

Figure 5:
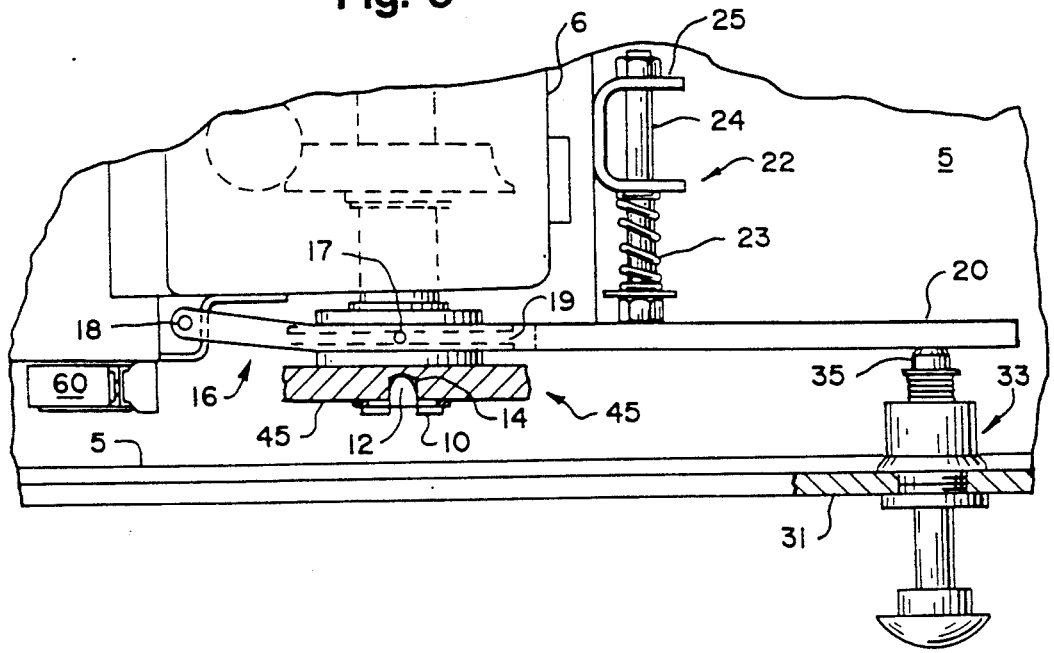
FIG. 5 is an additional partial tear-away view of the gear motor drive, clutch, and clutch fork actuator, with the operator front panel in position, particularly showing the clutch in an actuated position.

In order to obtain door operation independent of the door power drive, or door operation in the event of operator failure or in an emergency situation, the clutch fork actuating bar 20 is manaully actuated by a actuator assembly 30. As shown in FIG. 5, the normal position of the mushroom headed plunger 34 is extended somewhat from the surface of the movable panel 31 internally into the vehicle. In the event that uncoupling of the operator and door panels is desired, it is only necessary to move the plunger end 35 toward the panel, thereby actuating the clutch fork actuating bar 20, by compressing engaging spring 23 which allows the clutch fork assembly 16 to pivot on pins 17, thereby moving the slide collar and drive bar assembly 8 inward along shaft 10 and disengaging the gear box drive shaft teeth 12 and aperture slots 14. During clutch disengagement, drive rod ends 41 deflect inwardly, resulting in angular movement 43 of rods 40.

Figure 7:
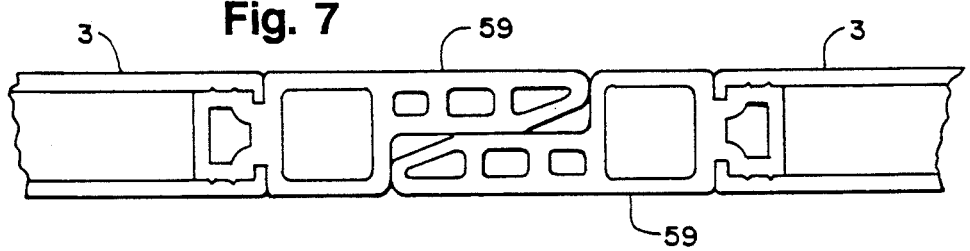
FIG. 7 is a partial cross section through the leading edge of the doors driven by the operator of the invention, particularly showing overlapping resilient door edges.
Figure 8:
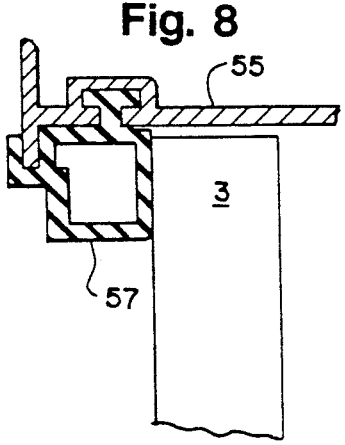
FIG. 8 is a partial section through the trailing edge of one of the doors, along line 8—8 of FIG. 1, driven by the operator of the invention to a fully closed position particularly showing a resilient seal between the vehicle frame and the door edge.

With the clutch disengaged, resilient edges 59, and vehicle body door seal 57 (Reference FIGS. 7 and 8), mounted on vehicle structure 55, having been compressed on closing, provide an initial door opening force. Therefore, on disengagement of clutch teeth 12 and slots 14, door panels 3 are moved ajar. Doors can then be manually moved to an open position. When normal door operation is desired, it is only necessary to actuate the door motor. Re-engagement of the clutch teeth and apertures will again place the doors in their original relative positions for power operation.

Figure 9:
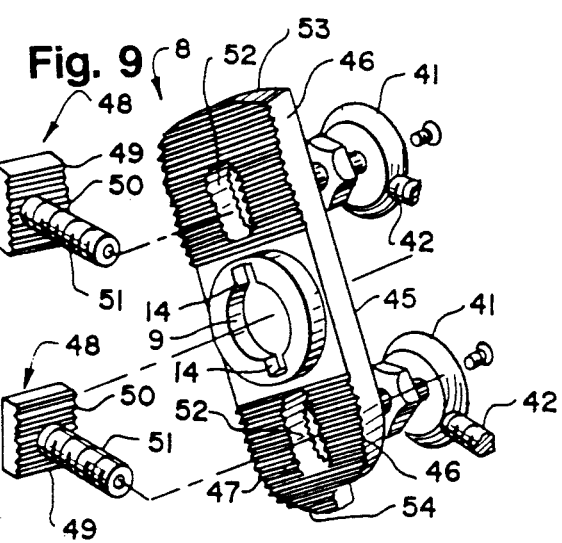
FIG. 9 is a partial view of the adjustable drive bar and bar arms of the operator of the invention, in exploded form, particularly showing the method of securing adjustable length in each drive arm and between the drive arm center and the coupled door drive rod end.

A particular feature of the drive system disclosed herein involves the utilization of variable length drive arms. As shown in FIG. 9, the drive arm or bar assembly 8 comprises a drive arm 45 having an aperture 9 for mounting on the gear box shaft 10. At each end 46 of the drive arm 45, a portion of the end incorporates an essentially corrugated surface 47. The drive arm 45 further incorporates elongated or slotted holes 52. The drive bar assembly 8 further incorporates operating rod end coupling assemblies 48 each having an operating shaft 51 and a cooperating head 49. In the assembled condition shown in FIG. 6, shafts 51 extend through slotted holes 52 and further extend through the spherical coupling ends 41, thereby fastening said coupling ends 41 to drive arm 45. In the assembled position, operating shaft heads 49 incorporate corrugated surfaces identical to corrugated surfaces 47 incorporated in the ends 46 of the drive arm 45. The mating corrugated and/or ridged surfaces 50 and 47 allow precise and permanently held adjustments in the distance from the center of gear box drive shaft 10 and the individual centers of rod ends 41.

As those skilled in the mechanical arts will readily see, this variation in the effective drive bar length provides individual adjustment of door movement and perhaps more importantly, allows adjustment of the forces holding the doors closed force due to compression of vehicle body seal 57, by door panel 3, and deflection and compression of door panel edges 57, on door closure of each individual panel. This allows individual adjustment of these residual forces and door panel phasing or relative motion between panels oh individual doors during the opening and closing operations, thereby compensating for variations in panel operating shaft locations and angular deviations.

Control of the door panels 3 is accomplished through external circuitry not shown, acting to provide reverse rotation of drive motor 4. Operating current for drive motor 4 passes in each operational situation to be described through limit switches 60 and 61 adjusted to be actuated by cam surfaces 54 and 53 of drive bar 45, respectively.

With particular reference to FIG. 1, with the doors as shown, in a fully closed position having been moved fully closed by counterclockwise rotation of drive shaft 10, powered by electric motor 4, the motor current has been interrupted in the fully closed position by limit switch 60. At this point, in external circuitry for clockwise rotation of drive shaft 10, current to motor 4 now passes through limit switch 61.

Figure 2:
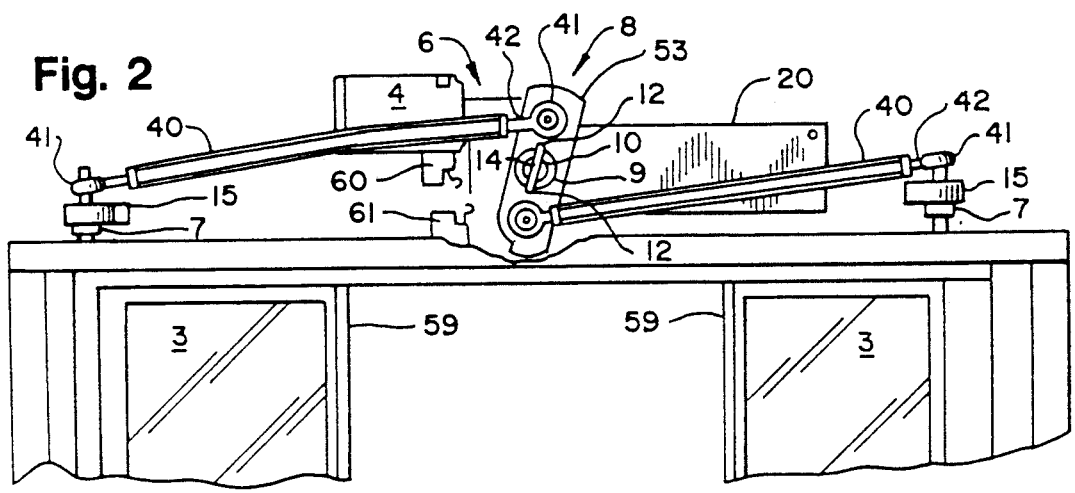
FIG. 2 is an additional partial view of the door system of the invention from inside the vehicle with cover removed, particularly showing the position of the rotating drive arm with vehicle doors in a semi-open position.

As shown in FIG. 2, external circuitry has energized motor 4 for clockwise rotation and doors as shown are partially open. Note that at this point both limit switches 60 and 61 are as shown in a nonactuated condition.

Figure 3:
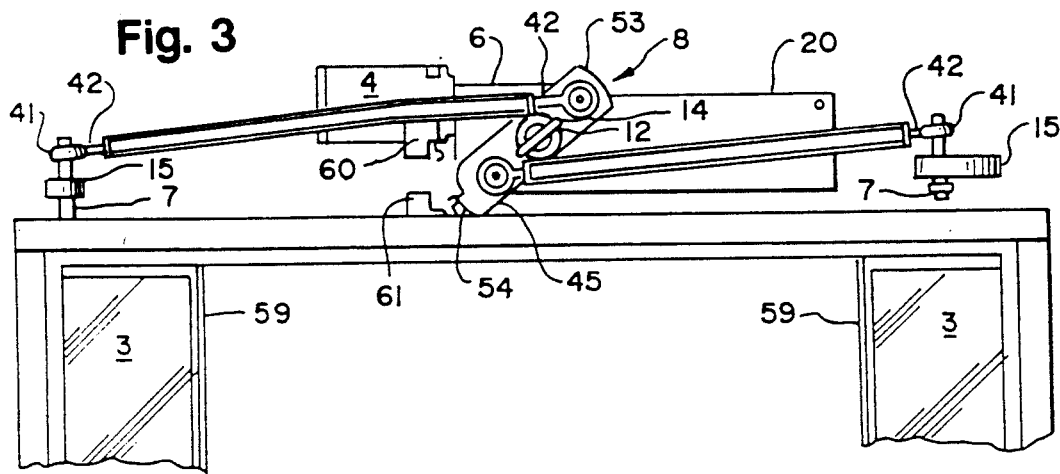
FIG. 3 is a view similar to FIGS. 1 and 2, however, showing the rotating drive arm with vehicle doors approaching a fully open position.
Figure 4:
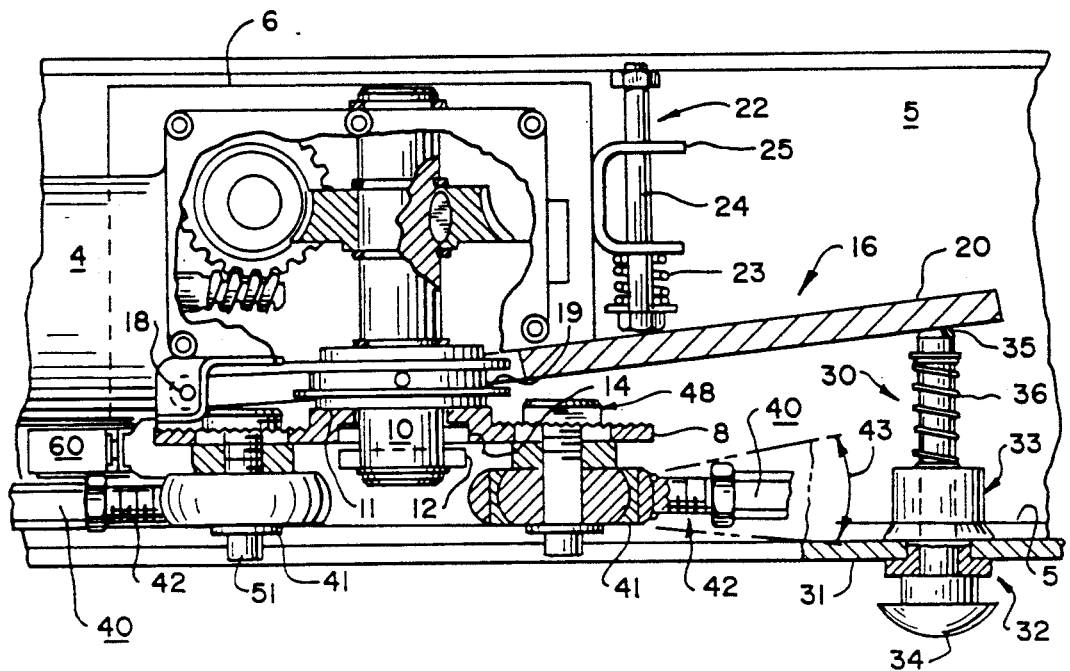
FIG. 4 is a partial plan and tear-away top view of the gear motor, clutch, and drive arm ends with the clutch in de-actuated state with the front panel in operating position, and doors in a released position allowing the doors to move freely.

With respect to FIG. 3, clockwise rotation of output shaft 10 driven by electric motor 4 has resulted in movement of cam surface 54 to a position where switch 61 has been actuated, thereby de-energizing drive motor 4. At this point the adjustment of switch 61 has resulted in the fully door open position of door panels 3. It should be noted that cam surface 54 has a reduced radius portion so that in the door open position only switch 61 is actuated.

Although mechanically operated switches 60 and 61 have been disclosed, other types of switches can be employed, such as non-contact proximity switches, optical switches wherein cam surfaces 53 and 54 would interrupt a radiation source on movement through a source beam, or other non-contact means for detecting position of a moving member.

Thus, it is apparent that there has been provided in accordance with the invention an electrically driven bus door operator, that fully satisfies the objects, aims, and advantages as set forth above. While the operator disclosed has been described in conjunction with a specific embodiment, it is evident that many alternatives, modifications, and variations will be apparent to those skilled in the art in light of the foregoing description. Accordingly, it is intended to embrace all such alternatives, modifications, and variations as may fall within the spirit and broad scope of the appended claims.

What is claimed as new and desired to be secured by Letters Patent of the United States is:

1. A combination comprising:
    a vehicle;
    a side wall in said vehicle, said side wall having interior and exterior surfaces;
    an opening in said side wall;
    at least one vertically oriented rectangular door panel having vertically oriented edges, said door panel further having at least an upper door shaft attached thereto for allowing door motion therearound for opening and closing said opening;
    means for mounting said door shaft on said side wall and adjacent to said opening;
    an electric power door operator over said opening for moving said door panel from an open position to a closed position, said operator having drive means including an output shaft facing said interior surface, said output shaft producing reciprocal rotary motion, said rotary motion being less than one revolution;
    means for mounting said operator on said side wall.
    a door drive bar mounted on and rotated by said output shaft, said bar having an arm extending from said output shaft, said arm having an end and a length;
    means for varying said arm length; and
    means, coupling said arm end and said door shaft, for transferring said rotary motion to said door motion thereby moving said door panel from said open position to said closed position;
    whereby said door motion being responsive to said rotary motion is varied in accordance with the varying of said arm length.

2. The combination of claim 1 wherein:

said operator mounting means mounts said operator overhead of said opening;

said combination further comprises a movable panel on said interior surface opposite said output shaft; and said operator further comprises:

clutch means, intermediate said output shaft and said drive bar, for engaging and disengaging said output shaft and said drive bar, said clutch means being operable by depressing a lever, said lever facing said movable panel; and a plunger having a first end and a second operating end, said plunger being mounted on said movable panel with said first end extending inwardly from said interior surface for reciprocal plunger motion through said movable panel, said plunger motion being sufficient for said second end to depress said clutch lever;

wherein manual actuation of said first end of said plunger operates said clutch means, thereby disengaging said door and said drive means by disengaging said output shaft and said drive bar.

3. The combination of claim 2 wherein said door panel has first and second horizontal edges and the vertically oriented edges of said door panel comprise first and second vertical edges, and the combination further comprises:

an exterior surface on said door panel;

a perimeter sealing surface of said door panel defined by said exterior surface thereof immediately adjacent said second vertical and said first and second horizontal edges thereof; and a wall seal on said side wall, said wall seal abutting said perimeter sealing surface when said door panel is in said closed position;

wherein abutting of said perimeter sealing surface and said wall seal generates second compressive forces in response to said door motion to said closed position, a door retention force being defined by said second compressive forces, and, when said door panel is retained in said closed position during vehicular operation, said actuation of said plunger removes said compressive forces allowing the compressive forces to move said door panel ajar.

4. In an electrically driven power door operator mounted overhead of an opening in a vehicle side wall, for moving a pair of bi-parting door panels from open to closed positions over said opening, the improvement comprising:

electric drive means having a housing and an output shaft extending therefrom;

means for controlling said drive means for reciprocal output shaft rotary motion, said motion being less than one-half shaft revolution;

the pair of door panels, each said panel being upright and rectangular and including an exterior surface, first and second vertical edges, and first and second horizontal edges, said first vertical edges abutting when said door panels are in said closed position;

a door drive bar coupled to said shaft by a clutch, said bar having oppositely disposed arms extending from said shaft;

coupling means on said arms, said arms having variable arm operating lengths by said coupling means being movable along said arms, said variable arm operating lengths establishing individually variable opening and closing door panel motion;

means for mounting said door panels over said opening for said door panel motion, said door panel motion being pivotal about said second vertical edges; and means for connecting said coupling means and said door panel mounting means;

whereby said door panel motion of each said door panel in response to said rotary motion is individually varied in accordance with varying of respective said arm operating length.

5. The operator of claim 4 further comprising:

a perimeter sealing surface of each said door panel defined by respective said exterior surface thereof immediately adjacent respective said second vertical and said first and second horizontal edges thereof;

a resilient door seal on each said first vertical edge; and wall seals on said side wall, said wall seals abutting respective said perimeter sealing surfaces when said door panels are in said closed position;

wherein abutting of said door seals generates first compressive forces in response to said door motion to said closed position, abutting of said perimeter sealing surfaces and said wall seals generates second compressive forces in response to said door motion to said closed position, a door retention force being defined by said first and second compressive forces, and, when said door panels are retained in said closed position during vehicular operation.

6. The operator of claim 5 wherein said mounting means comprises:

at least upper pivots on said first horizontal edges, said pivots being adjacent said second vertical edges;

means on said side wall for supporting said pivots for rotary motion therearound; and lever means on said upper pivots.

7. The operator of claim 6 further comprising:

exterior and interior surfaces on said vehicle side wall;

means for mounting said operator on said side wall overhead said opening, said operator mounting means positioning said output shaft adjacent said interior surface;

clutch teeth projecting from an end on said output shaft;

a centrally located bore in said drive bar having an internal wall, said internal wall defining clutch slots therein;

means for slidably engaging said bore on said output shaft;

means for biasing said clutch slots and teeth into engagement with a biasing force during sliding motion of said drive bar along said output shaft, said biasing force having a first force level; and means for generating an opposing force opposing and exceeding said first force level, thereby disengaging said clutch teeth and slots;

whereby said drive means and said door panels are uncouplable.

8. The operator of claim 7 wherein:

said connecting means comprises door drive rods intermediate said lever means and said arms; and said coupling means comprises spherical ends on said rods, said spherical ends enabling angular displacement of said rods during said sliding motion of said drive bar along said output shaft when said clutch teeth and slots are moved into or out of engagement.

9. The operator of claim 8 wherein:

said engaging means comprises a slide collar on said shaft intermediate said housing and said drive bar and attached to said drive bar; and said biasing means further comprises:

a clutch fork having a lever end and an opposite pivot end, said pivot end being mounted for angular displacement of said clutch fork on motion therearound;

a pair of fingers on said fork adjacent said pivot end, said fingers defining a fork space;

means for mounting said clutch fork such that said output shaft occupies said fork space;

means for slidably engaging said clutch fork on said collar intermediate said lever end and said pivot end; and spring means for urging said clutch fork away from said housing;

whereby said opposing force, when applied to said lever end, exceeds said first force level and moves said collar toward said housing, thereby disengaging said clutch slots from said clutch teeth.

* * * * *